Sept. 2, 1958   W. W. PRICKETT ET AL   2,849,845
FRUIT BOXER AND COUNTER
Filed May 17, 1956   5 Sheets-Sheet 1

Wilber W. Prickett
Floyd F. Dungan
    INVENTORS

BY
    Attorneys

Wilber W. Prickett
Floyd F. Dungan
INVENTORS

Sept. 2, 1958
W. W. PRICKETT ET AL
2,849,845
FRUIT BOXER AND COUNTER
Filed May 17, 1956
5 Sheets-Sheet 3
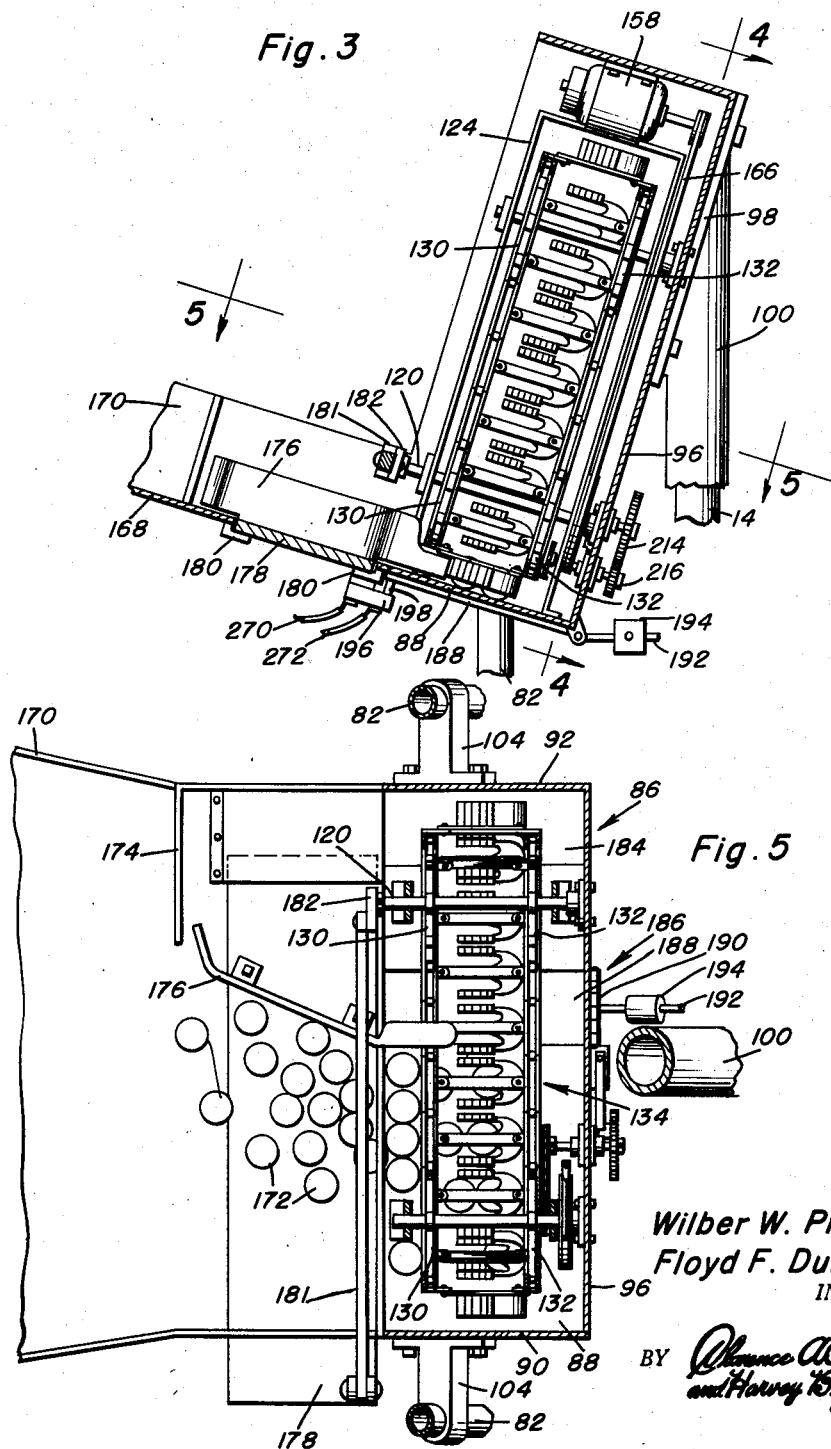
Wilber W. Prickett
Floyd F. Dungan
INVENTORS
BY *(signatures)*
Attorneys Sept. 2, 1958    W. W. PRICKETT ET AL    2,849,845
FRUIT BOXER AND COUNTER Filed May 17, 1956                               5 Sheets-Sheet 4

Wilber W. Prickett
Floyd F. Dungan
INVENTORS

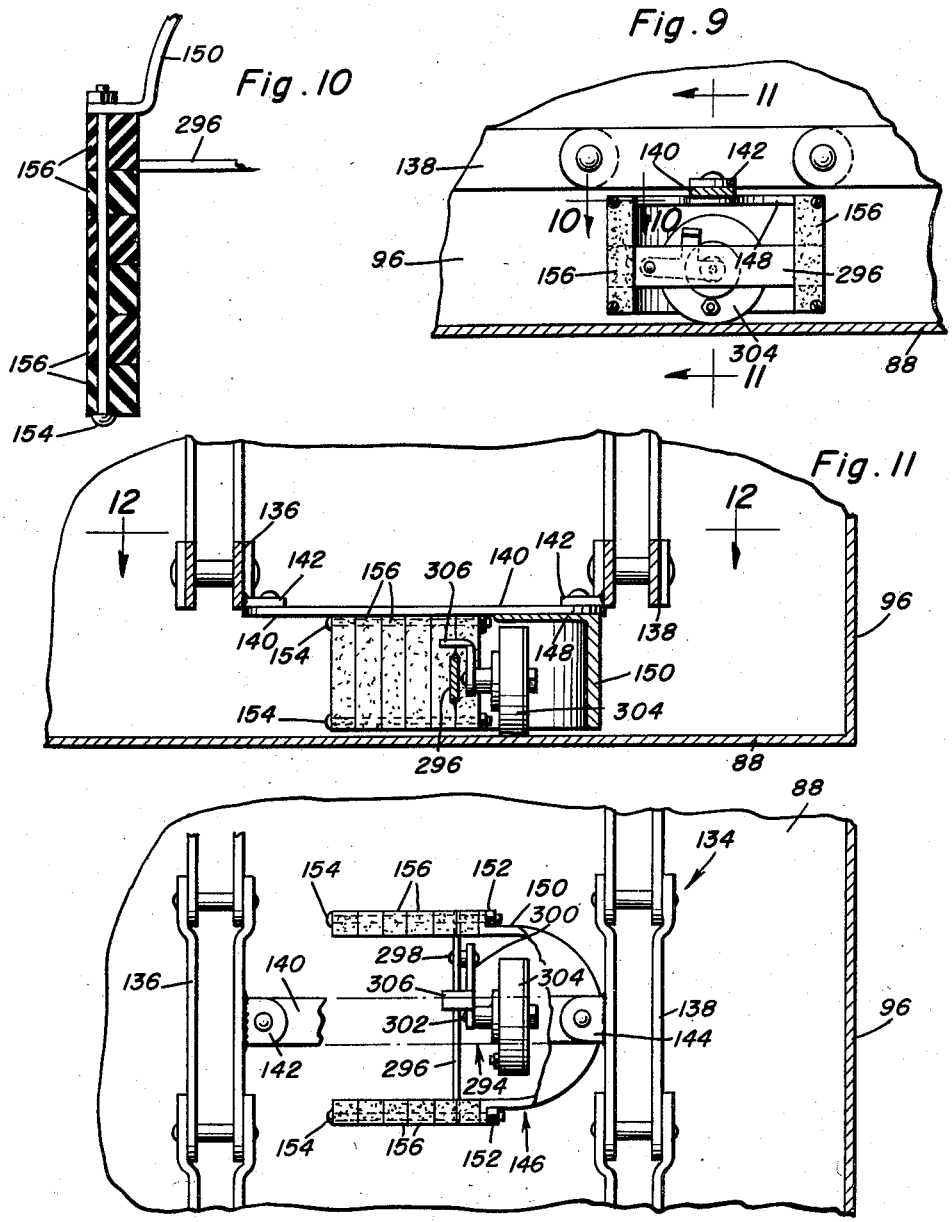

United States Patent Office 2,849,845
Patented Sept. 2, 1958

2,849,845

FRUIT BOXER AND COUNTER

Wilber W. Prickett, San Diego, and Floyd F. Dungan, Fillmore, Calif.

Application May 17, 1956, Serial No. 585,535

16 Claims. (Cl. 53—60)

This invention relates in general to new and useful improvements in material handling apparatus, and more particularly to an improved fruit boxer and counter.

At the present time fruit is sorted not only according to grade, but also according to size. The fruit is then packed in boxes with a predetermined number of pieces of fruit going into each box. In order that the number may be arrived at, the boxes are either filled by being weighed or manually counted in the case of hand pack. This is obviously an inaccurate and undesirable method. It is therefore the primary object of this invention to provide an improved fruit boxer which includes a counting apparatus, the counting apparatus being so constructed whereby the desired number of pieces of fruit is automatically placed in each box.

Another object of this invention is to provide an improved fruit counter which includes an endless conveyor carrying a plurality of pockets, the pockets being constructed for receiving fruit, there being provided suitable controls for actuating the conveyor whereby the conveyor is automatically stopped in the event the pockets are not all filled thereby preventing an inaccurate count based upon the pockets being filled.

Still another object of this invention is to provide an improved counter for fruit and the like, the counter utilizing an endless conveyor having a plurality of pockets for receiving fruit, the pockets being so constructed whereby they may be extended as desired to accommodate varying number and sizes of fruit so that a desired number of fruit may be handled by the conveyor and the fruit so counted.

Yet another object of this invention is to provide an improved counter for fruit, the counter including a conveyor having a plurality of pockets, the pockets being selectively provided with dummy members whereby a pocket may be either entirely or partially blocked off so that the conveyor with a predetermined number of pockets will be readily adjusted to accommodate a varying number of fruit upon each revolution of the conveyor.

A further object of this invention is to provide an improved fruit boxer and counter, the fruit boxer including a turntable supporting boxes, the fruit boxer underlying the counter and receiving fruit therefrom, there being provided suitable controls for the counter and the turntable whereby the counter is first actuated to fill a box with a predetermined number of pieces of fruit and then the turntable is actuated while the counter is stopped to provide an empty box in alignment with the counter and to remove the filled box.

A further object of this invention is to provide an improved turntable for fruit boxers, the turntable being provided with suitable stop members for positioning boxes thereon, the stop members being so mounted whereby they are automatically retracted upon the movement of a filled box adjacent a conveyor leading off from the table.

A still further object of this invention is to provide an improved turntable and vibrator assembly for fruit boxers and the like, the turntable being provided with openings therein selectively alignable with the vibrator, the vibrator being provided with a head which is passable through the opening and directly engageable with the box being filled for directly vibrating the box during a filling operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged fragmentary sectional view taken through the counter and shows the general details of the endless conveyor mounted therein for effecting the counting of fruit and the like;

Figure 3 is a fragmentary sectional view taken substantially upon the plane indicated by the section line 3—3 of Figure 2 and shows generally the details of the drive for the counter and the details of a cut-out switch mechanism for the drive of the counter which is actuated in response to the failure of the fruit to automatically fill the pockets of the conveyor;

Figure 5 is a fragmentary sectional view taken substantially upon the plane indicated by the section line 5—5 of Figure 3 and shows the details of the means for supplying fruit to the counter;

Figure 9 is a fragmentary sectional view taken through the counter and looking into an open end of one of the pockets of the conveyor and shows the general details thereof;

Figure 10 is an enlarged fragmentary sectional view taken substantially upon the plane indicated by the section line 10—10 of Figure 9 and shows the manner in which the lengths of the pockets may be selectively varied;

Figure 11 is an enlarged fragmentary sectional view taken substantially upon the plane indicated by the section line 11—11 of Figure 9 and shows the details of a dummy carried by the pocket to simulate the existence of a piece of fruit within the pocket;

Figure 1:
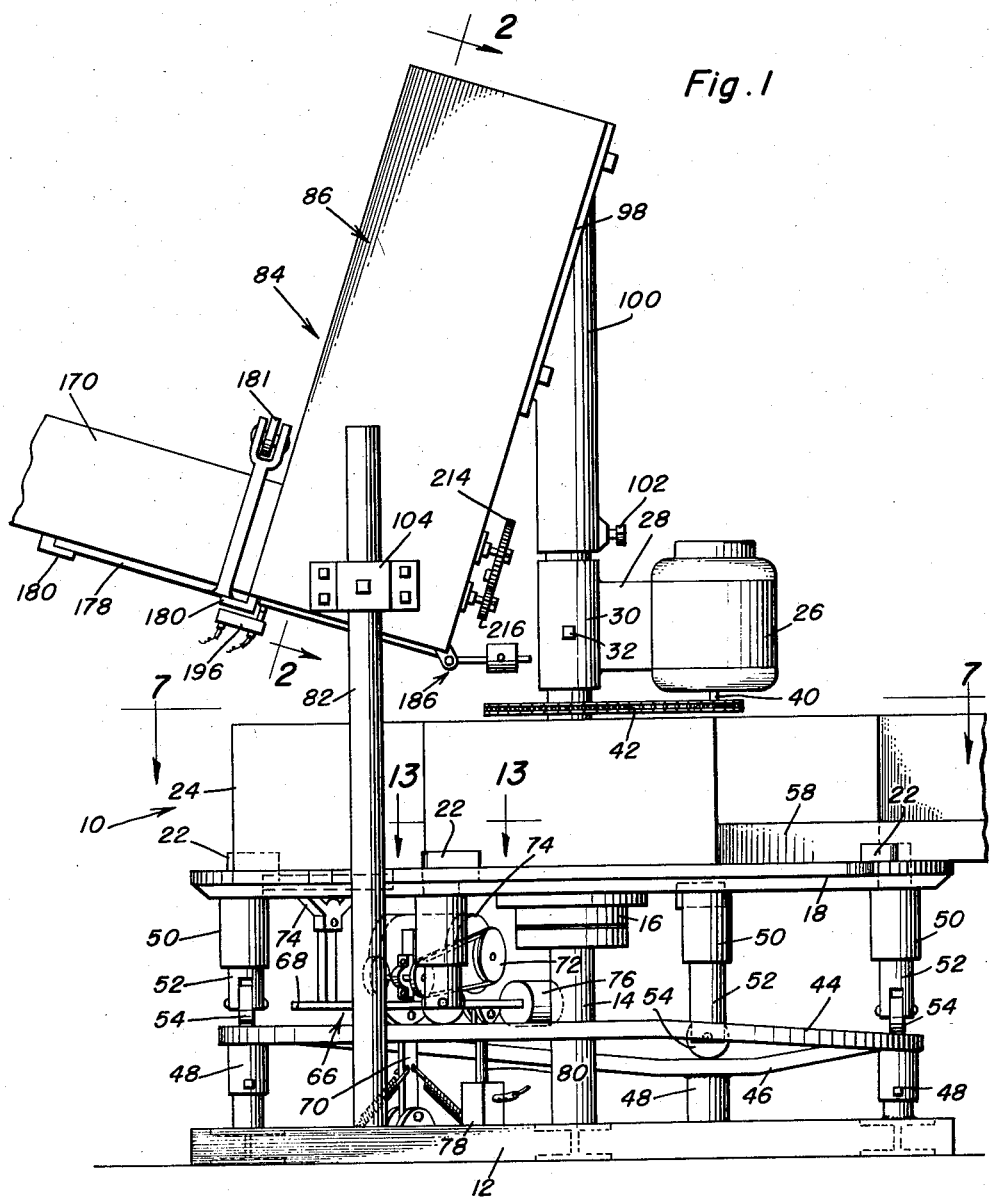
Figure 1 is a side elevational view of the fruit boxer and counter, which is the subject of this invention, and shows generally the details thereof.
Figure 13:
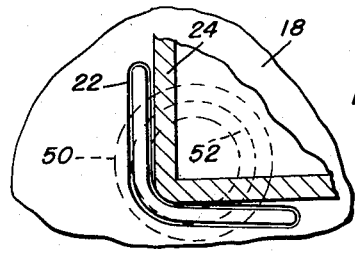
Figure 2:
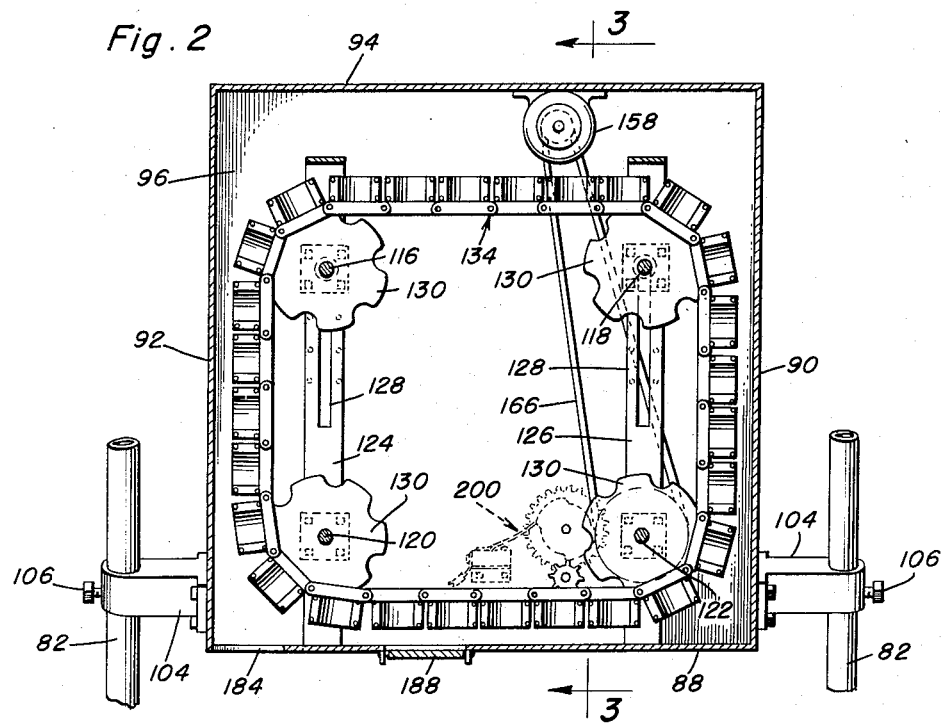

Figure 12 is an enlarged fragmentary sectional view taken substantially upon the plane indicated by the section line 12—12 of Figure 11 with portions of the pocket being broken away for purposes of clarity and further shows the specific details of the pockets; and Figure 13 is a fragmentary enlarged sectional view taken substantially upon the plane indicated by the section line 13—13 of Figure 1 and shows the details of a box positioning stop carried by the turntable and the relationship thereof with respect to a corner of a box.

Referring now to the drawings in detail, it will be seen that there is illustrated, particularly in Figure 1, the fruit boxer and counter which is the subject of this invention, the fruit boxer and counter being referred to in general by the reference numeral 10. The fruit boxer and counter 10 includes a suitable supporting base 12 which has extending upwardly from the central portion thereof a shaft 14. Mounted on the shaft 14 for rotation through the use of suitable bearings 16 is a turntable 18.

Figure 7:
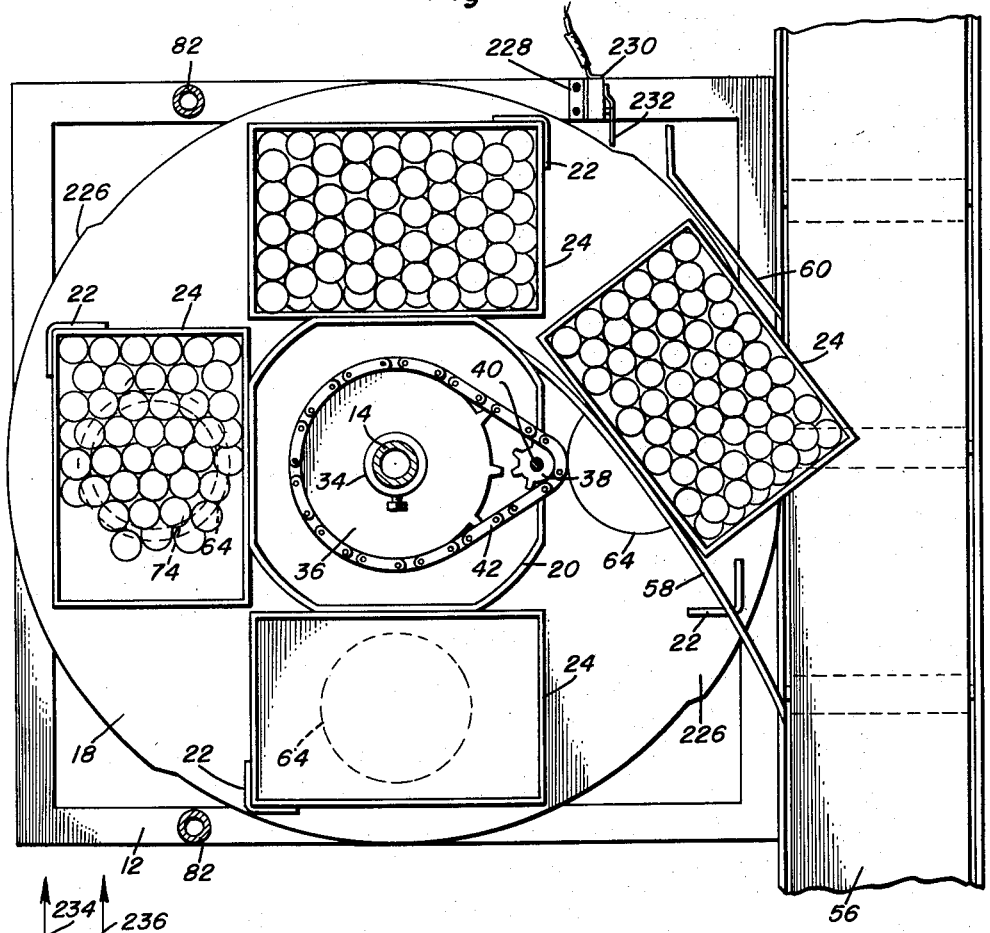
Figure 7 is a horizontal sectional view taken substantially upon the plane indicated by the section line 7—7 of Figure 1 and shows the general arrangement of the turntable including the drive means therefor and the arrangement of boxes thereon.

As is best illustrated in Figure 7, the turntable 18 is generally circular in outline and is provided in the central portion thereof with a box positioning guide 20. The turntable 18 is further provided with a plurality of circumferentially spaced box positioning stops 22. The box positioning stops 22 are mounted for vertical reciprocatory movement through the turntable 18 in a manner to be set forth in more detail to facilitate the removal of filled box from the turntable 18. The fruit boxes are referred to by the reference numeral 24 and are positioned by the guide 20 and an individual one of the stops 22.

In order that the turntable 18 may be selectively driven, there is provided drive means in the form of an electric motor 26. The electric motor 26 is carried by a mounting bracket 28 including a sleeve 30 which is clamped on an intermediate portion of the shaft 14 by means of a setscrew 32. Extending upwardly from the center of the turntable 18 is a sleeve 34 which surrounds the shaft 14. Secured to the upper end of the sleeve 34 is a driven sprocket 36 which is aligned with a drive sprocket 38 mounted on the armature shaft 40 of the electric motor 26. Entrained over the sprockets 38 and 36 and connecting the two together is a guide chain 42.

Disposed beneath the turntable 18 and above the supporting base 12 is a cam track 44. The cam track 44 includes a low portion 46. The cam track 44 is mounted on the supporting base 12 by means of telescoping supports 48 which are adjustable to properly position the cam track 44 with respect to the turntable 18.

Secured to the underside of the turntable 18 in alignment with each of the box stops 22 is a sleeve 50. Slidably mounted in each sleeve 50 for vertical reciprocatory movement is a shaft 52 which has a bifurcated lower portion receiving a roller 54. The upper part of each shaft 52 has secured thereto a lower part of one of the box stops 22. As the turntable 18 rotates, the rollers 54 roll about on the cam track 44. When the rollers 54 ride to the low portion 46 of the cam track 44, the shafts 52 move downwardly through the sleeves 50 with the result that the box stops 22 are depressed at that point.

Referring once again to Figure 7 in particular, it will be seen that disposed adjacent the depressed portion of the cam track 44 is a carry-off conveyor 56. The conveyor 56 is provided with suitable guide plates 58 and 60 so that a filled box 24 passing off of the turntable 18 will be moved onto the conveyor 56. Inasmuch as the box stop 22 for the filled box 24 would normally prevent its removal from the turntable 18, it will be seen that the cam stops 22 must be depressed when the filled box 24 approaches the vicinity of the conveyor 56.

In order that the boxes 24 may be vibrated during a filling operation, there is provided in the turntable 18 an enlarged opening 64 underlying each of the boxes 24. The openings 64 are provided so that access to the undersides of the boxes 24 may be attained from beneath the turntable 18. Mounted beneath the turntable 18 and supported by the base 12 remote from the conveyor 56 is a vibrator assembly which is referred to in general by the reference numeral 66. The vibrator assembly 66 is mounted on a horizontal plate 68 which is pivotally mounted on an upstanding support 70 carried by the base 12. Carried by the plate 68 is a suitable vibrator 72 which may be of any design. The vibrator 72 includes an electric motor 74. The vibrator 72 transmits the vibrations to the plate 68 which in turn transmits the vibrations to a vibrator head 73 which is aligned with one of the openings 64 and projects upwardly therethrough to engage the underside of the box 24 being filled. The plate 68 is retained in the generally balanced state by means of a counterbalance 76.

In order that the head 73 may be selectively raised and lowered to facilitate the engagement thereof with the bottom of the boxes 24 and at the same time to permit the turntable 18 to be rotated, there is provided a solenoid 78 having an operating shaft 80 which is secured to the plate 68. When the solenoid 78 is not energized, the head 73 will automatically return to a depressed position out of alignment with the turntable 18 permitting the turntable 18 to be rotated. However, when the solenoid 78 is actuated, the plate 68 is pivoted to move the head 73 into engagement with the bottom of the box 24 aligned therewith.

Extending upwardly from the supporting base 12 adjacent one end thereof is a pair of standards 82. Supported by the standards 82 and the shaft 14 is the counter which is referred to in general by the reference numeral 84. The counter 84 includes an upright, but slightly tilted, housing which is referred to in general by the reference numeral 86. The housing 86 includes a bottom wall 88, side walls 90 and 92, a top wall 94 and a rear wall 96.

In order that the counter 84 may be properly supported, there is secured to the rear wall 96 a plate 98 which is provided with a depending sleeve 100. The sleeve 100 is telescoped over the upper end of the shaft 14 and is retained in an adjusted position thereon by means of a set screw 102. Secured to the side walls 90 and 92 and extending outwardly therefrom are suitable brackets 104 receiving upper portions of the standards 82. The brackets 104 are adjustably secured to the standards 82 by means of set screws 106.

Secured to the rear wall 96 and projecting forwardly therefrom are suitable bearings 108, 110, 112, and 114. The bearings 112 and 114 are fixed with respect to the rear wall 96 whereas the bearings 108 and 110 are vertically adjustable for a purpose to be described in more detail hereinafter. Extending forwardly from the bearings 108, 110, 112 and 114, respectively, are shafts 116, 118, 120 and 122.

Extending upwardly from the bottom wall 88 in alignment with the bearings 108 and 112 is a yoke 124. A similar yoke 126 extends upwardly from the bottom wall 88 in alignment with the bearings 110 and 114. The yokes 124 and 126 form suitable supports for the forward portions of the shafts 116, 118, 120 and 122, as is best illustrated in Figures 3 and 5. The yokes 124 and 126 are provided with vertical slots 128 in the upper portions thereof to facilitate the vertical adjustment of the shafts 116 and 118.

As is best illustrated in Figures 3 and 5, carried by the shafts 116, 118, 120 and 122 are forward sprockets 130 and rear sprockets 132. Entrained over the sprockets 130 and 132 is an endless conveyor of the chain type, the endless conveyor being referred to in general by the reference numeral 134.

The endless conveyor 134 includes a forward chain 136 which is engaged over the sprockets 130. The conveyor 134 also includes a rear chain 138 which is engaged over the sprockets 132. Connecting together links of the chain 136 and 138 at spaced intervals are straps 140 which are connected to ears 142 and 144 secured to the chains 136 and 138, respectively. Carried by each of the straps 140 is a pocket which is referred to in general by the reference numeral 146.

Rigidly secured to the underside of the strap 140 is a horizontal flange 148 which forms a top wall of a U-shaped member 150, the U-shaped member 150 forming the back of its particular pocket 146. The U-shaped member 150 terminates at its forward end in outwardly directed flanges 152. Secured to the flanges 152 by means of elongated bolts 154 are rubber strips 156. The bolts 154 are replaceable by bolts of either longer or shorter lengths and the strips 156 may be increased in number or decreased as desired so that the depth of the pockets 146 may be selectively varied to receive a varying number of pieces of fruit. However, it is to be understood that the pockets 146 will generally receive either one or two pieces of fruit although it is possible that the pockets 146 may be extended to receive as many as three or four pieces of fruit.

In order that the conveyor 134 may be driven, there is secured to the underside of the top wall 94 an electric motor 158. The electric motor 158 includes an armature shaft 160 having mounted thereon a drive pulley 162. The shaft 122 is provided with a driven pulley 164 which is aligned with the pulley 162. Entrained over the pulleys 162 and 164 and connecting the two together in driving relation is a drive belt 166.

Referring now to Figures 3 and 5 in particular, it will be seen that there is aligned with the bottom wall 88 a bottom wall 168 of a fruit delivery chute 170. The bottom walls 168 and 88 slope downwardly towards the rear wall 96 so that the fruit, such as oranges 172 roll down into the individual pockets 146 to fill the pockets as the conveyor 134 moves transversely of the direction of flow of the oranges 172. In order that the oranges 172 may be directed to that portion of the conveyor 134 which first enters into the bottom part of the housing 86, there is provided an outer guide plate 174 and an inner guide plate 176. Further, the bottom wall 168 is provided with a transversely movable section 178 which is carried by a pair of rails 180. The section 178 has secured thereto the guide 176 so that the guide 176 also functions slightly as a paddle to move the oranges 172 in the desired direction.

In order that the section 178 may be reciprocated, it extends beyond the chute 170 to one side thereof and has connected thereto a link 181. The opposite end of the link 181 is connected to an eccentric wheel 182 which is carried by an extension of the shaft 120. Thus when the conveyor 134 is being driven, the oranges 172 are being shook and urged into the pockets 146.

The bottom wall 88 is provided adjacent the side wall 92 with an opening 184 which is aligned with the particular box 24 mounted on the turntable 18 for filling. Inasmuch as the bottom of the pockets 146 are open, the oranges 172 disposed within the pockets 146 will fall out and down through the opening 184 into the box 24.

In order to assure that all of the pockets 146 are filled so that a proper number of oranges 174 are disposed into the individual box 24, there is provided a control box which is referred to in general by the reference numeral 186. The control device 186 includes a plate 188 which forms a part of the bottom wall 88 and which is hingedly mounted on a hinge 190. Extending rearwardly from the plate 188 is a rod 192 on which there is mounted for adjustment a counterbalance weight 194. By adjusting the counterbalance weight 194, the amount of pressure required on the plate 188 to retain it in a lowered position may be selectively varied so as to accommodate fruit of varying number and sizes.

Referring now to Figure 3 in particular, it will be seen that there is secured to the underside of the guide 180 a switch 196. The switch 196 includes a plunger 198 which underlies the plate 188. As long as there is sufficient weight on the plate 188, that weight will counteract the weight of the counterweight 194 and the plunger 198 will remain depressed to cause the switch 196 to operate. However, in the absence of an orange in one of the pockets 146, the counterweight 194 will pivot the plate 188 upwardly thus releasing or opening the switch 196.

Figure 4:
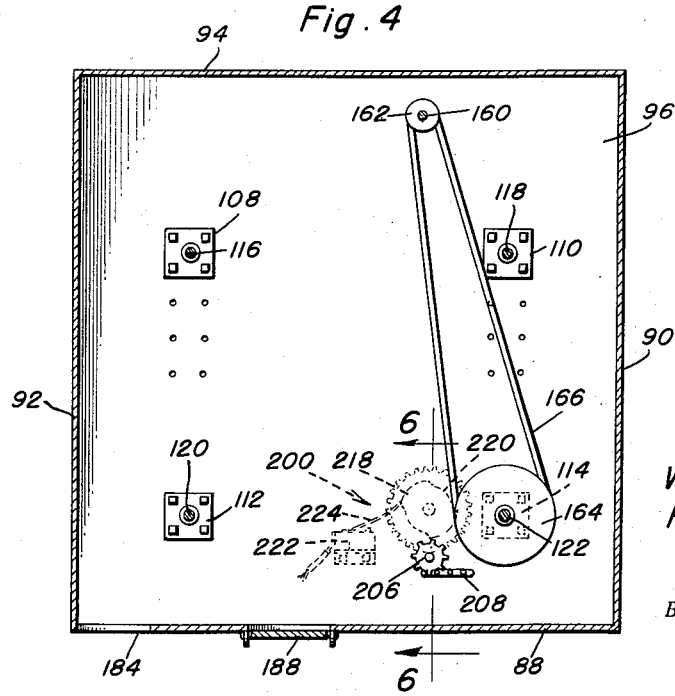
Figure 4 is a fragmentary sectional view taken substantially upon the plane indicated by the section line 4—4 of Figure 3 and shows further the specific details of the drive of the counter mechanism and the specific means for controlling the operation of the drive.
Figure 6:
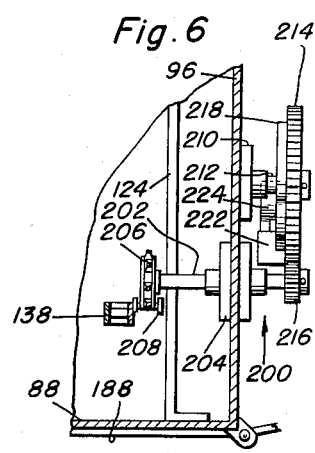
Figure 6 is an enlarged fragmentary sectional view taken substantially upon the plane indicated by the section line 6—6 of Figure 4 and shows the manner in which the drive gears of the counter may be selectively varied to produce a different count with the counter.

Referring now to Figures 4 and 6 in particular, it will be seen that there is illustrated a counter mechanism which is referred to in general by the reference 200. The counter mechanism 200 includes a shaft 202 which extends through the rear wall 96 and is suitably journaled in a bearing 204 carried by the rear wall 96. The forward part of the shaft 202 is provided with a drive sprocket 206 which is engaged by a very short section of chain 208 carried by the rear chain 138. Each time the conveyor 134 makes a complete revolution, the chain 208 will drive the sprocket 206 to rotate the shaft 202.

Carried by the rear surface of the rear wall 96 in spaced relation to the bearing 204 is a bearing 210. The bearing 210 carries a stub shaft 212. Removably carried by the shaft 212 is a gear 214. A similar, but smaller gear 216 is removably carried by the rear part of the shaft 202. It is to be understood that the gears 214 and 216 may be removed and replaced by other matched gears so as to vary the ratio of drive of the shaft 212 from the shaft 202.

Mounted on the shaft 212 forwardly of the gear 214 is a cam 218. The cam 218, as is best illustrated in Figure 4, is of the two lobe type and includes diametrically opposite lobes 220. The lobes 220 each extends approximately 90° about the circumference of the cam 218.

Mounted on the rear wall 96 is a three-way control switch 222 having an actuator 224 which is engaged with the cam 218.

Referring once again to Figure 7 in particular, it will be seen that the turntable 18 has the periphery thereof configurated so as to function as a cam. The periphery of the turntable 18 is so constructed whereby there is provided two lobes 226 which are disposed in diametrically opposed relation and which extends approximately 90° each. Extending upwardly from the supporting base 12 is a bracket 228 carrying a second three-way microswitch 230. The switch 230 is provided with an actuator 232 which is engageable by the lobes 226.

Figure 8:
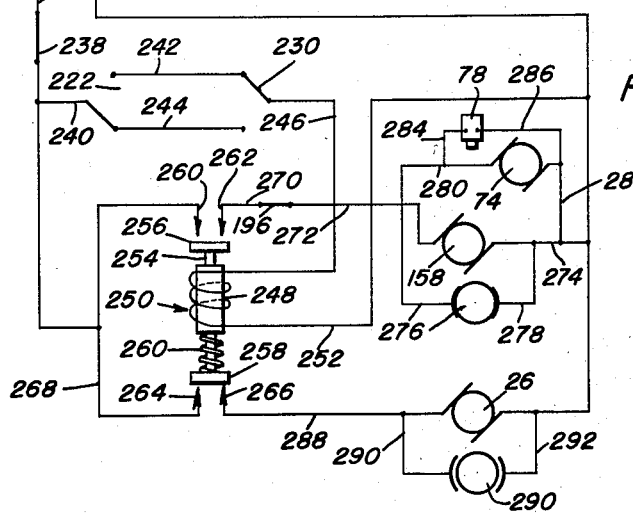
Figure 8 is a wiring diagram for both the counter and the turntable.

Referring now to Figure 8 in particular, it will be seen that there is illustrated the wiring diagram for the fruit boxer and counter 10. The wiring diagram includes a pair of main lead wires 234 and 236. Mounted in the main lead wire 234 is a shut-off switch 238. Connected to the main lead wire 234 is a wire 240 whose opposite end is connected to the three-way switch 222. The three-way switch 222 is connected to the three-way switch 230 in series by means of a pair of wires 242 and 244. Connected to the other terminal of the three-way switch is a wire 246 which is in turn connected to a solenoid 248 of a double throw switch which is referred to in general by the reference numeral 250. The solenoid 248 is connected to the lead wire 236 by a wire 252.

The switch 250 includes a plunger 254 having bridging contacts 256 and 258 at opposite ends. The switch 250 is spring urged to a position using the contact 258 by means of a spring 260. Thus when the solenoid 248 is not energized, the contact 258 is in a circuit closing position and the contact 256 is in the circuit opening position.

Associated with the contact 256 is a pair of contacts 260 and 262. Associated with the contact 258 is a pair of contacts 264 and 266. The contacts 260 and 264 are connected together by a wire 268 which is in turn connected to the wire 234.

Connected to the terminal 262 is a wire 270 whose opposite end is connected to the switch 196. Connected to the opposite terminal of the switch 196 is a wire 272 which is connected to one terminal of the electric motor 158. A second wire 274 is connected to the opposite terminals of the electric motor 158 and to the lead-in wire 236. The electric motor 158 is provided with a solenoid released, spring urged brake 276 of a conventional type so as to immediately stop the electric motor 158 when it is deenergized. The brake mechanism 276 has connected thereto lead wires 276 and 278 which are connected to the wires 272 and 274, respectively.

The electric motor 74 is connected in parallel with the electric motor 158. This is accomplished by means of wires 280 and 282 which are connected to the wires 272 and 274, respectively. Mounted in parallel with respect to the motor 74 is the solenoid 78. The solenoid 78 is connected to the wires 280 and 282 by means of wires 284 and 286, respectively.

The electric motor 26 is connected to the terminal 266 by means of a wire 288. An opposite terminal of the electric motor 26 is connected to the lead-in wire 236. The electric motor 26, like the electric motor 158 is provided with a solenoid release spring urged brake 290. The brake 290 is mounted in parallel to the motor 26 and is connected to the wires 288 and 236 by means of wires 290 and 292, respectively.

The wiring diagram shows the switches 222 and 230 in positions whereby the solenoid 248 is not energized. When the switch 250 is in the spring urged position thereof, the electric motor 26 is energized so as to rotate the turntable 18. The turntable 18 will rotate a quarter turn from its initial position until the switch 230 is moved to its opposite position. At this time the solenoid 248 becomes energized and the switch 250 will shift its position to close the circuit to the electric motors 74 and 158. At this time the counter 84 will be driven and the vibrator 66 will be actuated, the vibrator 66 being moved into an operative position by the solenoid 78.

In the operation of the counter 84, in order to assure that the proper number of oranges 172 are deposited in one of the boxes 24, there is placed on the conveyor 134 a predetermined number of pockets 146. The conveyor 134 may be shortened or lengthened by adding links and pockets and by moving the bearings for the shafts 116 and 118. The number of revolutions which the conveyor 134 makes before the switch 222 is actuated is determined by the ratio of the gears 214 and 216. Assuming that it is desired to place 63 oranges in a box, then there would be provided 21 pockets of a size to receive a single orange 172. The conveyor 134 would be rotated three times. If 75 fruit are desired, the number of pockets would be increased to 25. When 88 or more fruit are desired in a box, the pockets 146 are increased in length, as is best illustrated in the drawings at the present time, so as to accommodate two pieces of fruit. When 88 oranges are desired in the box, the double pocket arrangement is rotated two revolutions with there being 22 pockets in the conveyor 134. If 100 pieces of fruit are desired, the number of pockets will be increased 25.

In certain instances it is desired to place 110 pieces of fruit in a box. If 27 double pockets are used, then only 108 pieces of fruit will be dispensed. On the other hand, if 28 double pockets are utilized, then there will be dispensed 112 pieces of fruit. In order that 110 pieces of fruit may be deposited in a box by two revolutions of the conveyor 134 having 28 pockets 146 therein, it is necessary that one of the pockets carry only orange 172. Thus there would be in reality 27½ double pockets 146.

However, a pocket cannot be merely made shorter so as to accommodate only one piece of fruit inasmuch as the control mechanism 186 would be tripped by the passage of a single orange over the plate 188. It is therefore necessary to place in the particular pocket 146 which is to carry only one orange 172 a dummy. Such a dummy is best illustrated in Figures 9, 11 and 12 and is referred to in general by the reference numeral 294. The dummy 294 includes a mounting strap 296 which extends between a pair of the rubber strips 156 on opposite sides of the pocket 146. Pivotally connected to an end portion of the strap 296 by means of a pivot 298 is an arm 300. Carried by the arm 300 is a shaft 302 on which there is rotatably mounted a hollow weight roller 304. The roller 304 is filled with a suitable liquid, such as mercury, so that the weight thereof will be substantially the same as the size of orange 172 which is being counted. Downward movement of the roller 304 is limited by a stop 306 carried by the arm 300.

From the foregoing description of the dummy 294, it will be readily apparent that it will simulate an orange rolling across the plate 188 to prevent the stopping of the counter 84 by the opening of the switch 196.

From the foregoing description of the fruit boxer and counter 10, it will be readily apparent that it will be operable by a single operator. During the normal operation of the fruit boxer and counter 10, it is merely necessary for the operator to position empty boxes 24 on the turntable 18. However, in the event the pockets 146 are not completely filled, it is necessary for the operator to place an orange in the empty pocket so that the switch 196 will again be closed and the machine continued to operate in its normal function. As described above, the filled boxes 24 will automatically be moved off of the turntable 18 during the rotation thereof and onto the conveyor 56. The oranges 172 or other fruit which is to be boxed will be delivered to the counter 84 down the chute 170 and will require no efforts on the part of the operator. If desired, the fruit boxer and counter 10 may be mounted in a series of the same and one operator could operate more than one fruit counter 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, and control means for controlling operation of said drive means, said control means including a counter mechanism, certain of said pockets being provided with a dummy whereby the number of effective pockets may be varied.

2. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, and control means for controlling operation of said drive means, said control means including a counter mechanism, said control means including a weight operated control having an actuator disposed in the path of said pockets and actuated in response to the absence of fruit from said pockets to stop said drive means, certain of said pockets being provided with a dummy whereby the number of effective pockets may be varied.

3. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, and control means for controlling operation of said drive means, said control means including a counter mechanism, said control means including a weight operated control having an actuator disposed in the path of said pockets and actuated in response to the absence of fruit from said pockets to stop said drive means, certain of said pockets being provided with a dummy whereby the number of effective pockets may be varied, said dummy being in the form of a roller weight engageable with said actuator.

4. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, and control means for controlling operation of said drive means, said control means including a counter mechanism, said control means including a weight operated control having an actuator disposed in the path of said pockets and actuated in response to the absence of fruit from said pockets to stop said drive means, certain of said pockets being provided with a dummy whereby the number of effective pockets may be varied, said dummy being in the form of a roller weight engageable with said actuator, said roller weight being hollow and weighted with liquid whereby the effective weight of said roller weight may be varied to compensate for the particular fruit being counted.

5. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, and control means for controlling operation of said drive means, said control means including a counter mechanism, said control means including a weight operated control having an actuator disposed in the path of said pockets and actuated in response to the absence of fruit from said pockets to stop said drive means, said actuator including a counterbalance, said counterbalance being shiftable to compensate for the variation in weight in the fruit to be counted.

6. A fruit counter comprising a fruit receptacle, means for delivering fruit into said fruit receptacle, and endless conveyor mounted for movement through said fruit receptacle, pockets carried by said conveyor for receiving fruit from said fruit receptacle, a delivery opening for receiving fruit from said pockets, drive means connected to said endless conveyor, control means for controlling operation of said drive means, said control means including a counter mechanism, and means for increasing the depth of said pockets whereby the size and number of fruit accommodated by said pockets may be varied.

7. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, control means for controlling operation of said drive means, said control means including a counter mechanism, said drive means including an electric motor, said control means including a switch for said electric motor, a cam control for said switch, and cam drive means on said conveyor for actuating said cam control.

8. A fruit counter comprising a fruit receptacle, means for delivering fruit into said fruit receptacle, an endless conveyor mounted for movement through said fruit receptacle, pockets carried by said conveyor for receiving fruit from said fruit receptacle, a delivery opening for receiving fruit from said pockets, drive means connected to said endless conveyor, control means for controlling operation of said drive means, said control means including a counter mechanism, said drive means including an electric motor, said control means including a switch for said electric motor, a cam control for said switch, and cam drive means for said conveyor for actuating said cam control, said cam drive means including interchangeable drive elements for varying the ratio of drive of said cam control.

9. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, said first and second drive means each including an electric motor, said control means including a double throw switch for sequentially energizing said motors, and control mechanisms on said counter and said table for positioning said double throw switch.

10. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, said first and second drive means each including an electric motor, said control means including a double throw switch for sequentially energizing said motors, control mechanism on said counter and said table for positioning said double throw switch, said double throw switch being of the solenoid actuated type, and a control circuit for said double throw switch, said control mechanisms each including a three-way switch mounted in said control circuit, said three-way switches being mounted in series.

11. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, a vibrator mounted on said base beneath said table, box seats on said table, openings in said table aligned with said box seats, and vibration transmission means on said vibrator for positioning in one of said openings for engagement with a box covering said one opening.

12. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, box positioning stops slidably mounted on said table, and stop actuating means for facilitating the lowering of said stops to release a box from said table.

13. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, box positioning stops slidably mounted on said table, and stop actuating means for facilitating the lowering of said stops to release a box from said table, said stop actuating means including stop supports and a cam track, said stop supports riding on said cam track.

14. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, said fruit counter including a fruit receptacle, means for delivering fruit into said fruit receptacle, an endless conveyor mounted for movement through said fruit receptacle, pockets carried by said conveyor for receiving fruit from said fruit receptacle, and a delivery opening for receiving fruit from said pockets, said second drive means being connected to said conveyor, said control means including a counter mechanism.

15. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, said fruit counter including a fruit receptacle, means for delivering fruit into said fruit receptacle, an endless conveyor mounted for movement through said fruit receptacle, pockets carried by said conveyor for receiving fruit from said fruit receptacle, and a delivery opening for receiving fruit from said pockets, said second drive means being connected to said conveyor, said control means including a counter mechanism, certain of said pockets being provided with a dummy whereby the number of effective pockets may be varied.

16. A fruit counter and boxer comprising a supporting base, a box supporting table rotatably supported by said base, a counter carried by said base in overlying relation to said table for counting and delivering fruit to boxes on said table, first drive means for said table, second drive means for said counter, control means for said first and second drive means for sequentially driving said table and said counter whereby fruit is first counted and delivered to a box and then a next box is rotated into position relative to said counter, said fruit counter including a fruit receptacle, means for delivering fruit into said fruit receptacle, an endless conveyor mounted for movement through said fruit receptacle, pockets carried by said conveyor for receiving fruit from said pockets, said second drive means being connected to said conveyor, said control means including a counter mechanism, and means for increasing the depth of said pockets whereby the size and number of fruit accommodated by said pockets may be varied.

References Cited in the file of this patent

UNITED STATES PATENTS

| | | |
|---|---|---|
| 1,717,403 | Popov | June 18, 1929 |
| 2,632,588 | Hoar | Mar. 24, 1953 |
| 2,762,180 | Hall | Sept. 11, 1956 |